Mar. 3, 1925.
H. SCHLAICH
MIRRORSCOPE THERMOMETER
Filed Aug. 25, 1919
1,528,082
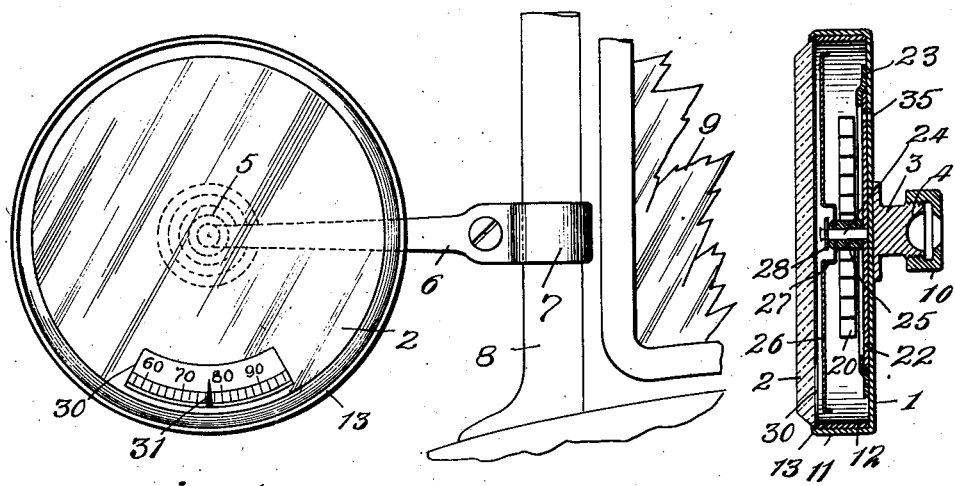
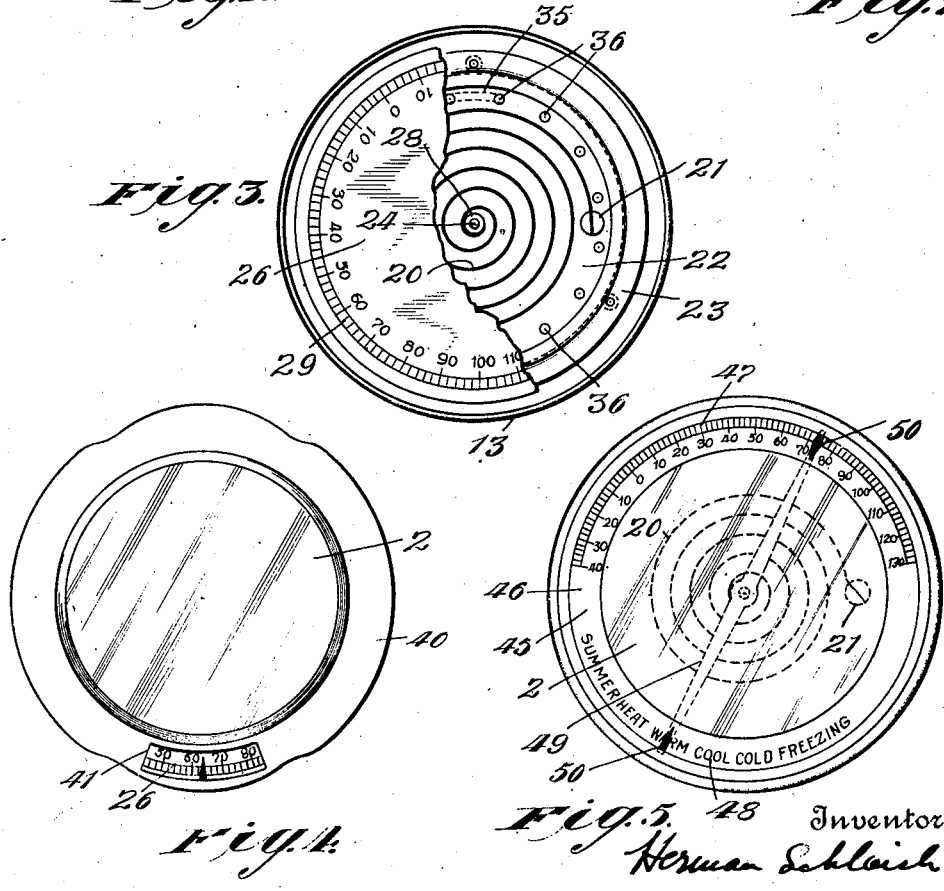
Inventor
Herman Schlaich
By his Attorney Patented Mar. 3, 1925.

1,528,082

UNITED STATES PATENT OFFICE.

HERMAN SCHLAICH, OF BROOKLYN, NEW YORK, ASSIGNOR OF ONE-HALF TO HARRISON H. BOYCE, OF FOREST HILLS, NEW YORK.

MIRRORSCOPE THERMOMETER.

Application filed August 25, 1919. Serial No. 319,781.

*To all whom it may concern:*

Be it known that I, HERMAN SCHLAICH, a citizen of Germany (having declared my intention of becoming a citizen of the United States), residing in the borough of Brooklyn, city of New York, county of Kings, State of New York, have invented certain new and useful Improvements in Mirrorscope Thermometers, of which the following is a specification.

This invention relates to the construction of instruments especially useful in connection with automobiles or other motor vehicles, and is designed to combine in a novel manner the functions of indicating certain conditions that it is desirable for the operator of the motor vehicle to know.

In the accompanying drawings, in which I have shown certain preferred embodiments of the invention for the purpose of illustrating the principle of the invention and the best mode now known to me for performing the same, Figure 1 is a face view of a preferred form of the instrument showing the same applied to one side of the windshield of an automobile;

Figure 2 is a vertical section of the instrument shown in Figure 1;

Figure 3 is a view of the instrument with the front of the same removed, a portion of the rotatable dial being broken away so as to show the interior construction;

Figures 4 and 5 are front views of modified forms of instruments.

Referring to the drawings in detail and particularly to Figures 1, 2 and 3, 1 designates a casing having its front closed by the mirror 2, and provided with means for attaching the same in suitable position to an automobile or other vehicle. As illustrated, the casing back has fixed thereto a stud 3 having a socket 4 therein which is adapted to receive the ball 5 on the end of the bracket arm 6, which is provided at the other end with suitable means for engagement with a part of the automobile, for instance, in the example illustrated, with a clamp 7 adapted to engage the standard 8 of the windshield 9. The ball 5 is clamped in the socket 4 by means of a screw cap 10, this construction permitting the position of the mirror to be accurately adjusted in a well understood manner so as to enable the driver to observe conditions to the rear of the vehicle. The casing 1 may be of any suitable construction and the mirror 2 may be mounted in any desired manner. A simple and effective construction is illustrated, however, in which the casing 1 is stamped out of sheet metal, and has a substantially flat back provided with a cylindrical side wall portion 11. Within the latter fits a spacing ring 12 upon the edge of which rests the peripheral portion of the mirror. The edge of the side wall 11 is flanged over the beveled edge of the mirror as shown at 13, and effectively secures the latter in position.

It is desirable for the driver of a motor vehicle to be able to ascertain atmospheric temperatures for several reasons. For instance, in cold weather information as to the temperature is desirable to enable the driver to know when it is necessary to take precautions against freezing of the water in the radiator when the engine is not running. Knowledge of the atmospheric temperatures is furthermore useful in connection with the observation of the instruments now generally employed on motor vehicles for indicating the thermal condition of the engine cooling system as the reading of said last-named instruments is sometimes more or less affected by the atmospheric temperature. If the latter is known proper allowances may be made and a more accurate determination of the thermal condition of the engine arrived at. These advantages of the use of a thermometer on a motor vehicle will be seen to relate especially to the operation of the vehicle, and are of course in addition to the usual advantages and general interest attached to knowledge of atmospheric temperatures. In ascertaining atmospheric temperatures on a motor vehicle a disturbing factor is present in the engine and associated parts which operate at a high temperature and it is important to mount any instrument which is to give a fair indication of atmospheric temperatures in such a manner as to be free from possible influence by the heat generated by the power plant. I have discovered that a very effective mounting for a thermometer, for the purposes indicated, is in a casing associated with the rear vision mirror as such a device is mounted at a point remote from the engine and also in a position where it is exposed to the outer air, as the vehicle travels along, whereby it is at all times responsive to the varying conditions encountered. In the particular construction illustrated I make the casing 1 of sufficient depth in rear of the mirror 2 to provide for the reception of suitable temperature responsive devices. I also provide in the face of the instrument means whereby the temperature may be read by the driver of the vehicle. The temperature responsive means in the construction shown is of the bi-metallic type and includes a bi-metallic coil 20 fixed at its outer end to a stud 21 carried on an adjustable back plate 22 which rests upon the back of the casing 1 and is retained in frictional engagement therewith by a ring 23 fixed to the casing back. Supported in the center of the back plate 22 is an arbor 24 upon which is journaled a sleeve 25 to which the inner end of the bi-metallic coil is attached. Fixed to this sleeve near the outer end thereof is the dial plate 26 which is shown as having a central depressed portion 27, which is fixed to the sleeve, the depression providing for the reception of the outer end of the arbor and of the securing washer 28 mounted thereon, thus permitting the main body of the dial to be brought up close to the rear surface of the mirror. On the face of the dial is a suitable scale 29. In order that the readings on the scale may be observed, the front of the instrument is provided with a window which in the construction illustrated in Figures 1, 2 and 3 is formed by eliminating a portion of the mirror backing from the mirror glass, as indicated at 30. About the center of the window thus formed, an index mark 31 is placed, preferably by being inscribed on the back of the glass, this mark cooperating with the scale on the indicating dial to indicate the temperature. The construction described presents a very neat appearance and provides an instrument which may be easily read without distracting the driver's attention, as it is located immediately adjacent to the mirror surface which he observes while driving. The use of the movable plate 22 upon which the thermometer mechanism is supported permits of the proper calibration of the instrument as an accurate initial adjustment may be secured by turning the plate slightly with respect to the casing, thus bringing the proper scale division on the rotatable dial opposite to the index 31 at the calibration temperature. In order to permit of the adjusting of the plate 22 from the outside, the back of the casing is preferably provided with a slot 35, while the back plate has a plurality of holes 36 near its margin, one or more of which may be reached through the slot by means of a pin which may be utilized to push the plate around sufficiently to produce the desired setting.

In Figure 4 I have shown a modified form of the invention in which the window for observation of the scale instead of being located directly in the mirror surface is formed in the casing which has a front wall portion 40 surrounding the mirror 2. The dial in this case is of larger diameter than the mirror so that its periphery is located back of this front casing wall and in position to be observed through the window opening 41 therein.

In Figure 5 another modification is illustrated in which an annular transparent space 45 is provided around the margin of the mirror so as to expose the margin of the fixed dial 46. The latter is illustrated as provided with a degree scale 47 and a word scale 48 having appropriate legends thereon. Cooperating with this fixed dial is a double ended pointer 49 the indices 50 of which are bent over the margins of the dial so as to sweep over the scales. The pointer may be actuated by suitable mechanism, such as a bi-metallic coil 20 of the form already described.

While I have illustrated and described in detail certain preferred embodiments of my invention, it will be understood that modifications may be made therein, and I do not, therefore, intend to limit myself specifically to the constructions shown, but intend to cover my invention broadly in whatever form its principle may be embodied.

Having thus described my invention, I claim:

1. The combination of a motor vehicle and a casing mounted thereon having a front wall including a reflecting surface and a window adjacent the periphery of the reflecting surface, temperature indicating means within the casing and readable through said window, temperature responsive means for actuating said indicating means, and means permitting universal angular adjustment of the reflecting surface for mounting the said casing upon a vehicle in a position which permits the driver to observe in the reflecting surface the traffic conditions in the rear of the vehicle and to observe the reading of the temperature indicating means.

2. The combination of a motor vehicle, and a casing mounted thereon having a front wall including a reflecting surface and a window adjacent the periphery of the reflecting surface, means responsive to temperature changes positioned within said casing between the rear and front walls thereof, and behind the reflecting surface, temperature indicating means actuated by said temperature responsive means and readable through said window, said casing being so mounted upon the vehicle that the reflecting surface will permit the driver to observe traffic conditions in the rear of the vehicle and to observe the reading of the temperature indicating means, said temperature responsive means being exposed to the outer atmosphere and free from the influence of the heat generated by the power plant of the vehicle.

H. SCHLAICH.